UNITED STATES PATENT OFFICE.

BENJAMIN PEACOCK, OF PHILADELPHIA, PENNSYLVANIA, ASSIGNOR TO LARROWE CONSTRUCTION COMPANY, OF DETROIT, MICHIGAN.

PROCESS OF MAKING OXID AND HYDROXID OF BARIUM.

1,250,642.      Specification of Letters Patent.      Patented Dec. 18, 1917.

No Drawing.      Application filed May 27, 1916. Serial No. 100,283.

*To all whom it may concern:*

Be it known that I, BENJAMIN PEACOCK, a citizen of the United States, residing at Philadelphia, in the county of Philadelphia and State of Pennsylvania, have invented certain new and useful Improvements in Processes of Making Oxid and Hydroxid of Barium; and I do hereby declare the following to be a full, clear, and exact description of the invention, such as will enable others skilled in the art to which it appertains to make and use the same.

This invention relates to a process of making oxids and hydroxids of barium from carbonates of barium and has for its object to produce these products in a manner more efficient and less costly than has been heretofore proposed.

With these and other objects in view the invention consists in the novel combinations of steps constituting the process more fully hereinafter described and particularly pointed out in the claims.

Barium carbonate as is well known, has a melting point which is below its temperature of dissociation to the oxid under normal conditions, so that it reaches a sticky or fused state before its carbonic acid gas is evolved. That is to say, as the temperature rises barium carbonate first melts, and the surface tension of the mass combined with the pressure of the considerable quantity of the fused carbonate that must be dealt with in a manufacturing process seriously retards the escape of any carbonic acid gas which may be liberated when the temperature of dissociation is reached. Therefore, in practice considerable difficulty is experienced in preparing the oxid from the carbonate.

This invention, on the other hand, obviates this difficulty as will now be disclosed. I make an intimate mixture of barium carbonate and calcium oxid, using the latter in such proportions that at the temperature of fusion of the barium carbonate there will result a dry granular mass instead of a sticky, fused mass.

In other words, the particles of calcium oxid which are infusible at the temperatures employed become coated with films of the fused barium carbonate, and still retaining their identity to a large extent they individually offer a very small surface tension to be overcome, and therefore while causing the mass to take on a dry, granular character they readily permit any evolved carbonic acid gas to escape notwithstanding the total weight of the fused mass would be sufficient to exert a considerable pressure when not associated with the calcium oxid.

In practice commercial barium carbonate may be mixed with say 80% of its weight of calcium oxid, whereupon the mass may be fused, and stirred if desired, when a very satisfactory evolution of carbonic acid will be had as soon as the temperature is high enough. The process may be conveniently carried out in a rotary kiln such as is used in the Portland cement industry, or any other suitable type of furnace may be employed. I find about 1200° C. to be a suitable temperature to effect the dissociation, or evolution of the carbonic gas, leaving behind a mixture of barium and calcium oxids.

The calcined product is next removed from the furnace and treated with hot water to obtain a solution of barium hydrate, or the barium oxid may be separated out by any suitable means.

If the furnacing action is continued long enough substantially all the barium carbonate may be converted into the oxid, but it is found more economical to stop said action when about 70% to 80% of the carbonate has been thus converted.

As the insoluble residue from the leaching process contains some unaltered barium carbonate and contains all the original calcium oxid in the form of slaked lime, these materials may be returned to the furnace for the next cycle of operations, after being suitably finely subdivided, and therefore, no valuble barium salts are lost.

In other words, it is an important feature of this invention that no raw materials need be lost, for even when the efficiency of the conversion to the oxid becomes low from any cause, the undissociated carbonate as well as all the original calcium oxid reappears in the furnace during the next cycle of operations.

This invention should be carefully distinguished from a somewhat similar prior process in which barium sulfate, instead of barium carbonate, is employed. For, in order to render said prior process operative, the temperature must be raised so high that calcium sulfate inevitably forms. This said calcium sulfate later will react with the barium hydrate present when water is introduced, and thus said hydrate is destroyed to a greater or less extent. By the employment of barium carbonate, on the other hand, as in this invention, a much lower temperature is involved, and no troubles due to the formation of calcium sulfate are met with.

It is obvious that those skilled in the art may vary the details of the invention without departing from the spirit thereof, for example other inert materials may be substituted for the calcium oxid, and therefore it is not desired to be limited to the above disclosure except as may be required by the claims.

What is claimed is:—

1. The process of producing barium oxid from barium carbonate which consists in mixing said carbonate with an inert material to facilitate the evolution of carbonic acid gas when heat is applied; and heating the mixture to a temperature sufficient to drive off said gas, substantially as described.

2. The process of producing barium oxid from barium carbonate which consists in mixing said carbonate with calcium oxid; and heating the mixture to a temperature sufficient to cause the evolution of carbonic acid gas, substantially as described.

3. The process of producing barium hydrate from barium carbonate which consists in mixing said carbonate with oxid of calcium; heating the mixture to a temperature sufficient to cause an evolution of carbonic acid gas; and treating the heated product with water to extract the desired barium hydrate, substantially as described.

4. The process of producing barium hydrate from barium carbonate which consists in mixing said carbonate with calcium oxid; heating the mixture to a temperature sufficient to cause an evolution of carbonic acid gas; causing the heating of said mixture before all the said carbonate has been converted into barium oxid; treating the product with water; separating the barium hydrate thus formed from the residue; and returning said residue to the next mixture in order to convert its contained barium carbonate into barium oxid, substantially as described.

In testimony whereof I affix my signature, in presence of two witnesses.

BENJAMIN PEACOCK.

Witnesses:
E. L. KNIGHT,
H. B. SLEEK.